Patented Dec. 18, 1951

2,578,742

UNITED STATES PATENT OFFICE 2,578,742

MANUFACTURE OF AROMATIC AMINE THIOCYANATE-ALDEHYDE CONDENSATION PRODUCTS

Thomas E. Robbins, Pittsburgh, Pa., assignor to Koppers Company, Inc., Pittsburgh, Pa., a corporation of Delaware No Drawing. Application August 12, 1947, Serial No. 768,271

19 Claims. (Cl. 260—72.5)

This invention relates to methods for effecting condensation of aniline thiocyanate with aldehyde.

The reaction of aniline thiocyanate with aldehyde is strongly exothermic. This, coupled with the fact that aniline thiocyanate is readily converted to monophenyl thiourea, reduces yields of the desired product, gives it an undesirable physical appearance, and in other respects complicates the process. It is an object of the present invention to avoid such difficulties.

Even where the reaction is so carried out that conversion of aniline thiocyanate to monophenyl thiourea is a minor factor, a further complication arises to the formation of a lumpy mass which appears to be an incomplete condensation product of aniline thiocyanate and aldehyde. It is a further object of this invention to avoid or to minimize the formation of such a product.

I have now found that these objects are accomplished by introducing aniline thiocyanate into an aqueous solution of formaldehyde at a rate such that there is no substantial amount of unreacted aniline thiocyanate in the reaction medium at any time while cooling the reaction medium during the reaction sufficiently to minimize conversion of aniline thiocyanate to monophenyl thiourea.

In carrying out the processes of the invention, aniline thiocyanate as such, but preferably dissolved in water, is slowly introduced into a solution of aldehyde with sufficient stirring to prevent local overheating and with sufficient cooling to maintain the temperature below that at which substantial conversion of aniline thiocyanate to monophenyl thiourea takes place.

With properly dilute solutions and with the rate at which aniline thiocyanate is added sufficiently low, it is possible to obtain satisfactory condensation at relatively high temperatures; say, to as high as about 40° C. It is preferred, however, to carry out the process at a substantially lower temperature; say, at or below about 15° C. Because of these temperatures greater leeway is provided with respect to concentration of the reagents and the rate at which they may be brought together. Moreover, the product is obtained as a finely divided particulate solid which is easily filtered from the solution and has desirable physical characteristics for packaging and otherwise handling.

The invention may be more fully understood by reference to the following examples in which the parts are by weight unless otherwise specified:

Example I 1940 c. c. of an aqueous solution of aniline thiocyanate containing 3.3 mols of the compound, are slowly added to 495 grams (6.6 mols) of a 40% aqueous formaldehyde solution. The mixture is constantly stirred and kept at about 12° C. Slowly a milkiness begins to appear and the color gradually changes to a light yellow due to finely dispersed solid. The color of the solid deepens while the amount increases, until a large quantity of a scarlet colored, finely divided product is produced at the end of the addition of the aniline thiocyanate solution. Filtration and washing with water yields an almost theoretical quantity of the desired aniline thiocyanate formaldehyde condensation product. The material thus obtained is a thermo-setting resin which after setting does not melt at temperatures up to 300° C. and on heating gradually turns brown and then black. It was found to be a good pickling inhibitor.

In place of aniline thiocyanate there may be substituted homologous compounds thereof, and in place of formaldehyde there may be substituted other aldehydes. Suitable homologues of aniline thiocyanate include toluidine thiocyanate, xylidine thiocyanate, p-tertiary amyl aniline thiocyanate, alpha naphthylamine thiocyanate, beta naphthylamine thiocyanate, ortho amino diphenyl thiocyanate, etc., and suitable aldehydes include acetaldehyde, crotonaldehyde, butyraldehyde, cinnamic aldehyde, furfural glyoxal, etc.

Aniline thiocyanate solution or otherwise is added until the proportions reach 2 mols of aldehyde for each mol of aniline thiocyanate. More or less may be used without interfering with the reaction, but is undesirable since it merely brings about an excess of one or the other of the reagents.

Instead of adding aniline thiocyanate to a body of aldehyde solution under agitation as set forth in the example, other means of avoiding local excess of aniline thiocyanate may be used. Separate streams of aniline thiocyanate solution and formaldehyde solution, for example, may be brought together in a turbulence tube or otherwise, provided the rates are adjusted to provide at least 2 mols of aldehyde for each mol of aniline thiocyanate. The common and essential feature is to add the aniline thiocyanate, preferably in aqueous solution, to an aqueous solution of the formaldehyde at a rate such that there is no substantial amount of unreacted aniline thiocyanate in the reaction medium at any time during the reaction.

The concentrations of the solutions likewise may vary. It is desirable, however, that the reaction be effected in dilute solution. It is desirable to have at least about 2 parts of total water for each part of total reagent. This water may be distributed between the two reagents as desired, keeping in mind the respective solubility of the aniline thiocyanate and aldehyde.

While I have described my invention with reference to particular embodiments, it will be understood that variation may be made therefrom without departing from the spirit and scope of the invention as set forth herein and in the appended claims.

I claim:

1. In a process for condensing an aldehyde with a pseudomerizable aromatic amine thiocyanate which condenses with the aldehyde in the proportions of two moles of aldehyde for each mole of the aromatic amine thiocyanate with a strong exotherm whereby the heat of reaction tends to cause the aromatic amine thiocyanate to convert to its pseudomer, the steps of introducing the aromatic amine thiocyanate into an aqueous solution of the aldehyde at a rate such that there is no substantial amount of unreacted aromatic amine thiocyanate in the reaction medium at any time while cooling the reaction medium to minimize conversion of the aromatic amine thiocyanate to its pseudomer, the amount of aromatic amine thiocyanate thus introduced being not greater than one mole for each two moles of aldehyde.

2. The process of claim 1 in which the aromatic amine thiocyanate is selected from the class consisting of aniline thiocyanate and the homologues thereof and in which the cooling is sufficient to keep the temperature below 40° C.

3. The process of claim 2 in which the cooling is sufficient to keep the temperature below about 15° C.

4. The method of claim 2 in which the aromatic amine thiocyanate is also in aqueous solution when it is introduced into the aqueous solution of the aldehyde.

5. The method of claim 4 in which the cooling is sufficient to keep the temperature below about 15° C.

6. The method of claim 1 in which the aldehyde is formaldehyde and the aromatic amine thiocyanate is aniline thiocyanate.

7. The method of claim 6 in which the cooling is sufficient to keep the temperature below 40° C.

8. The method of claim 7 in which the cooling is sufficient to keep the temperature below about 15° C.

9. The method of claim 8 in which the aniline thiocyanate is also in aqueous solution when it is introduced into the aqueous solution of formaldehyde.

10. The method of claim 6 in which the aniline thiocyanate is also in aqueous solution when it is introduced into the aqueous solution of formaldehyde.

11. In a process for condensing an aldehyde with a pseudomerizable aromatic amine thiocyanate the aromatic radical of which is a hydrocarbon radical of the benzene and naphthalene series in which heat of reaction tends to cause the aromatic amine thiocyanate to convert to its pseudomer, the steps of adding the aromatic amine thiocyanate to an aqueous solution of the aldehyde at a rate such that there is no substantial amount of unreacted aromatic amine thiocyanate in the reaction medium at any time during the reaction while cooling the reaction medium to minimize conversion of the aromatic amine thiocyanate to its pseudomer, the amount of aromatic amine thiocyanate thus added being not greater than ½ mol for each mol of aldehyde.

12. The method of claim 11 in which the cooling is sufficient to keep the temperature below 40° C.

13. The method of claim 11 in which the cooling is sufficient to keep the temperature below about 15° C.

14. The method of claim 13 in which the aromatic amine thiocyanate is added in aqueous solution.

15. The method of claim 11 in which the aromatic amine thiocyanate is added in aqueous solution.

16. The process of claim 1 in which the amount of water present is at least two parts for each part of total reagent.

17. The process of claim 16 in which the aromatic amine thiocyanate is also in aqueous solution when it is introduced into the aqueous solution of the aldehyde.

18. The process of claim 16 in which the aldehyde is formaldehyde and the aromatic amine thiocyanate is aniline thiocyanate.

19. The process of claim 17 in which the aldehyde is formaldehyde and the aromatic amine thiocyanate is aniline thiocyanate.

THOMAS E. ROBBINS.

REFERENCES CITED

The following references are of record in the file of this patent:

UNITED STATES PATENTS

| Number | Name | Date |
|---|---|---|
| 1,812,749 | Kienle | June 30, 1931 |
| 2,199,155 | Gams | Apr. 30, 1940 |
| 2,425,320 | Hill | Aug. 12, 1947 |